W. H. CHERRY.
SPIKE PULLER.
APPLICATION FILED APR. 28, 1919.
1,311,948.
Patented Aug. 5, 1919.
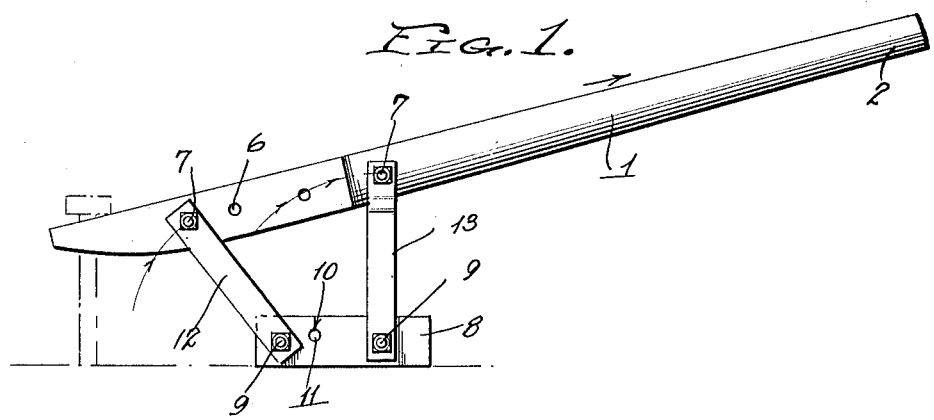
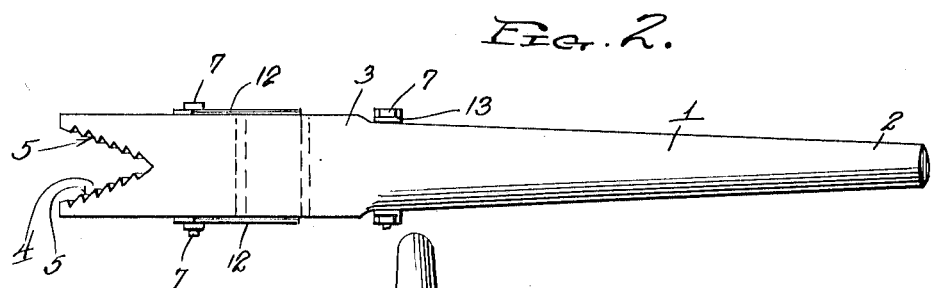
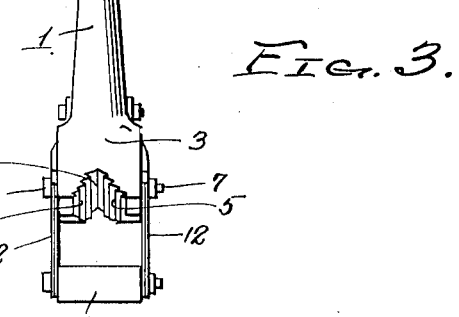
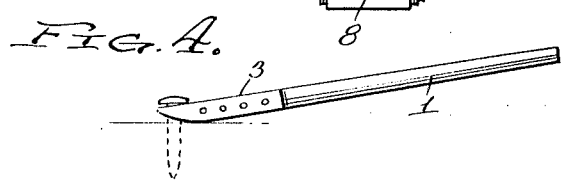
Inventor
William H. Cherry

UNITED STATES PATENT OFFICE.

WILLIAM H. CHERRY, OF NILWOOD, ILLINOIS.

SPIKE-PULLER.

1,311,948.  Specification of Letters Patent.  Patented Aug. 5, 1919.

Application filed April 28, 1919. Serial No. 293,240.

*To all whom it may concern:*

Be it known that I, WILLIAM H. CHERRY, a citizen of the United States, residing at Nilwood, in the county of Macoupin and State of Illinois, have invented certain new and useful Improvements in Spike-Pullers, of which the following is a specification.

This invention relates to spike pullers and more particularly to an implement adapted for engaging the heads of spikes in order that they may be readily pulled from their positions.

One of the objects of the invention is to provide an implement of this character especially adapted for extracting railroad spikes from their positions in railroad ties, the apparatus being designed to more conveniently accomplish this operation and including an arrangement whereby a more effective grip and leverage may be obtained during the pulling operation.

A further object of the invention is the provision of a device of this character which consists of comparatively few parts and is simple in construction, but durable and well adapted to withstand the rough usage to which devices of this character are ordinarily subjected.

For a full description of the invention and the advantages and merits thereof, reference is to be had to the following description and accompanying drawings, in which:—

Figure 1 is a side elevation of the instrument constructed in accordance with my invention, Fig. 2 is a plan view of the same, Fig. 3 is a front end elevation.

Fig. 4 is a view of the implement showing another use to which it may be put.

Referring to Figs. 1, 2 and 3 of the drawing, wherein is illustrated the preferred form of my invention, the implement includes the elongated bar 1 which forms a handle 2 and a large head 3 which is of substantially rectangular formation as shown in Fig. 2. This head is provided at one end with a V-shaped notch 4, the sides of which are provided with teeth 5 whereby a more effective grip may be obtained on the spike. The sides of the head 3 are parallel as shown and the head is provided with transverse opening 6 through which removable bolts 7 are passed. A plurality of openings 6 may be formed but only two bolts 7 are employed. A base block 8 is employed in connection with the implement and comprises a substantially square block having transverse openings therethrough to receive removable bolts 9. A slightly offset opening 10 is also provided to receive a stop pin 11 which projects laterally from the sides of the block 8 for a purpose which will presently appear. A pair of links 12 are connected to the ends of the bolt 9 in the forward end of the block 8 and these links have their opposite ends connected to the foremost bolt 7 which is passed through one of the openings 6. A second pair of links 13 have their lower ends received on the projecting ends of the rearmost bolt 9 in the block 8 and their opposite ends joined to the other of the bolts 7, this arrangement being shown to advantage in Figs. 1 and 3 of the drawings.

When the device is in use, the block 8 will be placed in position adjacent the spike whereupon the tool will be swung forwardly until the head of the spike is received in the notch 4, the teeth 5 engaging the same to prevent slipping. By exerting a downward pressure on the outer end of the handle 2, the pulling head 3 will be swung upwardly and backwardly toward the operator so that an upward and an angular pull is exerted on the spike. The swinging links 12 and 13 cause this particular swinging as indicated by the arrows in Fig. 1, and inasmuch as the links 12 are somewhat longer than the links 13, this rearward and upward movement of the pulling head will continue while a pressure is exerted on the handle 2. After the head of the spike has been raised sufficiently to permit the operator to thrust the notched end under the head, this may be done by sliding the implement forwardly after which the continued pressure is exerted on the handle to completely withdraw the spike.

The device, as shown in Fig. 4, may also be used for extracting loose spikes and as a wrench, when the nuts of a bolt are to be removed. In this case, the sides of the notched ends are engaged with the nut whereby the latter may be turned when it is screw threadedly mounted on the bolt. The nut may then be raised sufficiently to permit the end of the tool to be inserted beneath the nut so that a prying action may be exerted on the bolt to withdraw it from its position.

It will be noted that the bottom surface of the head 3 is beveled so that a leverage may be obtained for this purpose.

The foregoing description and accompanying drawings have reference to what might be considered to be the approved or preferred form of my invention. I desire it to be understood that I may make such changes in construction, combination and arrangement of parts, materials, dimensions, et cetera, as may prove expedient and fall within the scope of the appended claims.

Having thus fully described my invention what I claim as new and desire to secure by Letters Patent, is:—

1. An implement of the character described comprising a shank having a head formed at one end, and equipped with transverse openings, a pair of bolts inserted through any of the said openings, a base block, a pair of parallel links connected to each of the said bolts, and means for pivotally connecting the said links to the said base blocks.

2. An implement of the character described comprising a shank having a head formed at one end, the end of the said head being provided with a notch, bolts carried by the head, parallel links arranged in pairs and mounted on the ends of the said bolts at opposite sides of the said head, and a base block pivotally connected to the said links below the said head to maintain the latter in elevated swingingly mounted position.

In testimony whereof I affix my signature in presence of two witnesses.

WILLIAM H. CHERRY.

Witnesses:
S. O. MOLEN,
FRANK B. HUBER.

Copies of this patent may be obtained for five cents each, by addressing the "Commissioner of Patents, Washington, D. C."